United States Patent [19]

Dreilich et al.

[11] Patent Number: 5,099,961
[45] Date of Patent: Mar. 31, 1992

[54] DISC BRAKE

[75] Inventors: Ludwig Dreilich, Kronberg; Thomas Egerer, Karben; Karl-Fr. Woersdorfer, Budenheim, all of Fed. Rep. of Germany

[73] Assignee: Alfred Teves GmbH, Frankfurt am Main, Fed. Rep. of Germany

[21] Appl. No.: 467,816

[22] Filed: Jan. 19, 1990

[30] Foreign Application Priority Data

Jan. 31, 1989 [DE] Fed. Rep. of Germany ....... 3902790
Jun. 6, 1989 [DE] Fed. Rep. of Germany ....... 3918369

[51] Int. Cl.⁵ .............................................. F16D 65/38
[52] U.S. Cl. ................................. 188/73.35; 188/73.36; 188/73.37
[58] Field of Search ............... 188/73.35, 73.36, 73.37, 188/73.44, 73.45, 378, 379, 380, 382, 218 XL, 218 A, 71.1, 370

[56] References Cited

U.S. PATENT DOCUMENTS

| | | | |
|---|---|---|---|
| 1,974,562 | 9/1934 | Dodge | 188/382 X |
| 3,388,772 | 6/1968 | Marsh et al. | 188/379 |
| 3,866,977 | 2/1975 | Rice | 188/218 A |
| 4,022,302 | 5/1977 | Janssen | 188/73.1 |
| 4,067,418 | 1/1978 | Rath et al. | 188/73.36 X |
| 4,154,322 | 3/1979 | Yamamoto et al. | |
| 4,155,430 | 5/1979 | Kawamura | 188/73.35 |
| 4,243,123 | 1/1981 | Watanabe | |
| 4,267,903 | 5/1981 | Kita et al. | 188/370 |
| 4,523,666 | 6/1985 | Murray | 188/218 XL |
| 4,660,685 | 4/1987 | Thackel et al. | 188/73.37 |

FOREIGN PATENT DOCUMENTS

| | | | |
|---|---|---|---|
| 1161355 | 8/1969 | Fed. Rep. of Germany | 188/73.31 |
| 2236536 | 2/1974 | Fed. Rep. of Germany | |
| 2242877 | 3/1974 | Fed. Rep. of Germany | |
| 3044393 | 6/1982 | Fed. Rep. of Germany | |
| 0047023 | 4/1980 | Japan | 188/73.35 |
| 0200819 | 11/1984 | Japan | 188/73.35 |
| 0270930 | 11/1988 | Japan | 188/73.35 |

OTHER PUBLICATIONS

Kelsey, *Disc Brake Service Manual*, Romulus MI, Sep. 1975, pp. 7 and 11.

Primary Examiner—Robert J. Oberleitner
Assistant Examiner—Chris Schwartz
Attorney, Agent, or Firm—Robert P. Seitter; J. Gordon Lewis

[57] ABSTRACT

An improved disc brake which avoids brake noises. Mass is added to one or both of the brake housing and the brake carrier to preclude the natural frequencies of several components from coinciding, thereby preventing noise in that resonant frequency.

6 Claims, 1 Drawing Sheet

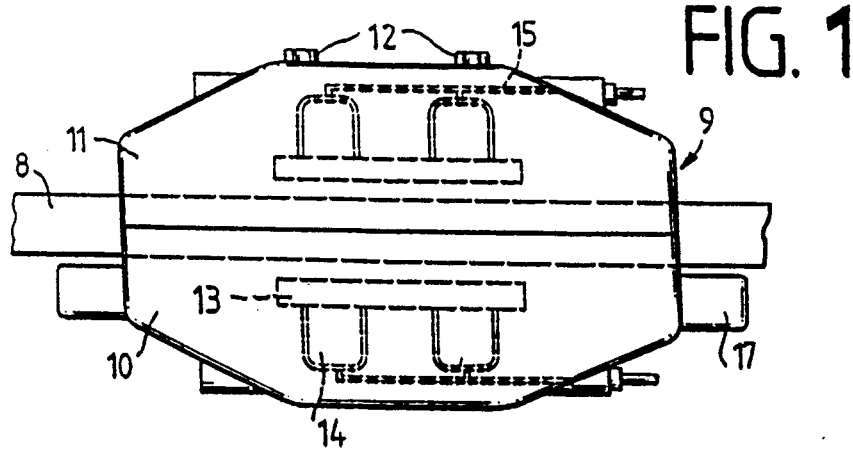
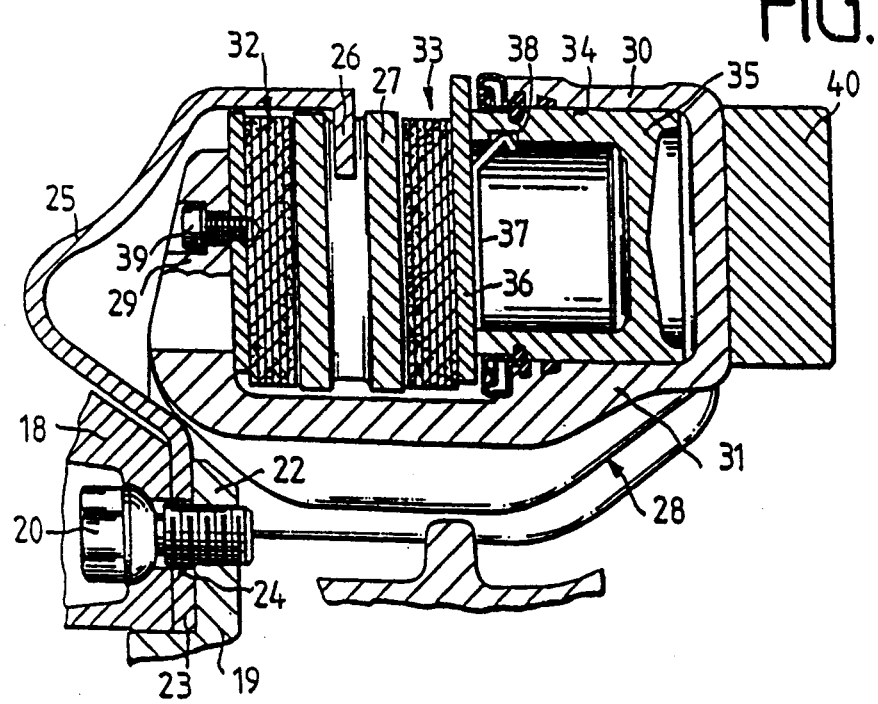
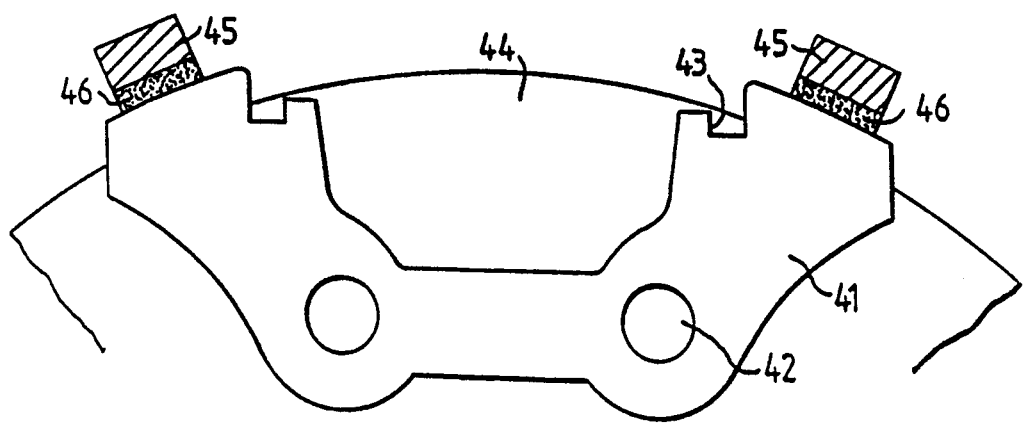

DISC BRAKE

TECHNICAL FIELD

The present invention relates to disc brakes, in particular, for any possible design of motor vehicles.

BACKGROUND OF THE INVENTION

Brake squeals or lower-frequency noises often occur in disc brakes. Attempts have been made previously to eliminate this, for example, by selecting proper brake lining materials or by applying an intermediate layer between the brake lining and the backing plate (West German Preliminary Published Patent Application No. 36 17 846).

Furthermore, U.S. Pat. No. 4,691,810 discloses that the brake shoe begins to vibrate, during braking, and that this vibration causes brake noises. That patent also explains that, during braking, a vibration node is formed in the center of the brake shoe and oscillation loops are formed in the area of the lateral guides of the brake shoe. To prevent brake squeal—at least on the indirectly actuated brake shoe—the patent teaches that the arms of the brake housing should be attached in a special manner to the backing plate of the non-piston-side brake shoe and that the force should be transmitted through this attachment. However, it has been impossible previously to avoid squealing of the piston-side lining by any measures of the above-described type.

SUMMARY OF THE INVENTION

Therefore, it is the object of the present invention to effectively and permanently prevent brake noises in disc brakes using the parts previously employed in the brake.

This object is achieved by taking one or more of several measures, independently or in combination. The various solutions are all based on the same principle. In most cases, brake noise is caused by the coincidence of the resonance frequencies of all or several of the components. Squealing usually occurs at the common natural frequency. If the mass of one or more of the components is changed, by adding extra mass, it will also be possible to shift the natural frequencies relative to one another. Ideally, they can be adjusted such that they will not mutually influence and, above all, will not reinforce one another.

In one embodiment of the present invention, the extra masses are advantageously arranged in fixed-caliper type disc brakes on the housing in the circumferential direction, so that they are positioned radially next to the brake disc and, therefore, they do not require any additional mounting space within the wheel rim contour.

In a second embodiment, the extra mass is advantageously arranged in so-called internally straddling disc brakes on the side of the brake housing facing the center of the vehicle. This is a particularly space-saving measure.

An elastic adhesive layer can be used to cement extra masses, to prevent low frequency noises during braking. The inversely phased oscillation of the component and the extra masses allows the vibration to be greatly damped, so that it will disappear rapidly.

Further details and advantages of the present invention will become evident from the following description of the embodiments, which will be more fully explained by reference to the accompanying drawings.

BRIEF DESCRIPTION OF THE DRAWINGS

FIG. 1 is a schematic plan view of a fixed caliper-type disc brake with extra masses arranged on the brake housing in the circumferential direction;

FIG. 2 shows an axial section through an internally straddling disc brake with extra masses; and FIG. 3 shows schematically a brake carrier with extra masses cemented on the carrier using an elastic adhesive.

DETAILED DESCRIPTION OF THE INVENTION

FIG. 1 shows, in a schematic representation, a fixed-caliper disc brake with a brake housing 9 straddling the brake disc 8 and comprising two housing parts 10, 11. Housing part 11 is connected by bolts 12 to the steering knuckle (not shown). In a known manner, brake housing 9 has connections which are not explained in greater detail. Shown inside brake housing 9 are the brake shoes 13, the pistons 14 applying pressure to brake shoes 13, and the pressure fluid channels 15 conveying brake fluid to pistons 14. Extra masses 17, which alter the resonant frequency of brake housing 9 by changing the mass of housing 9, are arranged on both sides of housing part 10 in the circumferential direction. Extra masses 17 may also be cast in one piece with one of housing parts 10, 11, so that subsequent fixation will be unnecessary.

FIG. 2 shows an axial section through an internally straddling disc brake. Concerning the vehicle wheel, only part of the wheel dish 18 and of the wheel bearing housing 19 are shown. A brake disc holder 21 is fastened to flange 22 with a bolt 20, and brake disc holder 21 is arranged between flange 22 and wheel dish 18. Brake disc holder 21 has a radially inwardly located, substantially circular mounting section 23, in which bores 24 are provided to receive bolts 20, and has a carrier section 25 conforming to the contour of wheel dish 18. Carrier section 25 forms an end section extending substantially in an axially parallel direction, and a connecting ring 26 is fastened to, or special fastening sections are formed on, carrier section 25. A friction ring 27, which forms the actual brake disc, is fixed to connecting ring 26.

The internally straddling disc brake also has a brake housing 28 which is substantially U-shaped and has two radially outwardly extending legs 29, 30 interconnected through a bridge part 31. Brake shoes 32, 33, straddled by the U-shaped brake housing 28, are arranged on both sides of friction ring 27. For actuating the disc brake, the inwardly disposed leg 30 has a cylindrical bore 34, in which a piston 35 is arranged to move axially. Piston 35 applies pressure directly to the inwardly disposed brake shoe 33, and, in response, brake housing 28 is displaced inwardly in the opposite direction, so that pressure is also applied to the outwardly disposed shoe 32.

To secure brake shoe 33 against a radially outward movement, a spring 37 engages an annular groove 38 provided in piston 35 and is attached to backing plate 36. The outwardly disposed brake shoe 32 is bolted to the outer leg 29 of brake housing 28 by two mounting bolts 39. On the side of leg 30 turned away from piston 35, an extra mass 40 is attached to alter the natural frequency of brake housing 28.

FIG. 3 shows schematically a side view of a brake carrier 41. Shown are bores 42 for fixation to the steering knuckle (not shown) and the recesses 43 for guiding the brake shoes (not shown). The contour of brake disc 44 is also shown. Extra masses 45 are cemented next to recesses 43. Elastic adhesive layers 46, preferably of acrylate, silicone, or the like, permit the extra masses 45 to vibrate along with carrier 41, so that vibrations are rapidly damped or are prevented from developing in the first place.

What is claimed is:

1. A disc brake for a vehicle comprising:
   a housing;
   a brake disc mounted within said housing;
   a brake shoe mounted within said housing for movement toward and away from said brake disc;
   a carrier for attaching said disc brake to said vehicle; and
   an extra mass component attached to said carrie and having a mass selected to oppose coincidence of the resonance frequencies of said housing, said brake disc, and said brake shoe.

2. A disc brake as claimed in claim 1 wherein said extra mass component is attached to said carrier by an adhesive.

3. A disc brake as claimed in claim 1 wherein said extra mass component is affixed to the points in said brake carrier having the largest oscillation amplitude on vibration of said brake shoe.

4. A disc brake as claimed in claim 1 wherein said brake carrier includes a recess for guiding said brake shoe and said extra mass component is affixed to said brake carrier in a position substantially adjacent said recess.

5. A disc brake as claimed in claim 2 wherein said adhesive is acrylate.

6. A disc brake as claimed in claim 2 wherein said adhesive is silicone.

* * * * *